United States Patent
Sivaramakrishnan et al.

(10) Patent No.: US 10,024,314 B2
(45) Date of Patent: Jul. 17, 2018

(54) CONTROL SYSTEM AND METHOD OF CONTROLLING A ROD PUMPING UNIT

(71) Applicant: General Electric Company, Schenectady, NY (US)

(72) Inventors: Shyam Sivaramakrishnan, Niskayuna, NY (US); Kalpesh Singal, Niskayuna, NY (US); David Warren Doyle, Lufkin, TX (US); Fatemeh Zamanian, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 329 days.

(21) Appl. No.: 14/814,226

(22) Filed: Jul. 30, 2015

(65) Prior Publication Data

US 2017/0030170 A1 Feb. 2, 2017

(51) Int. Cl.
*F04B 49/06* (2006.01)
*G05B 15/02* (2006.01)
(Continued)

(52) U.S. Cl.
CPC .......... *F04B 49/065* (2013.01); *E21B 43/127* (2013.01); *E21B 47/0008* (2013.01);
(Continued)

(58) Field of Classification Search
CPC ...... F04B 47/02; F04B 47/022; F04B 49/065; F04B 49/20; E21B 43/127; E21B 47/0008; G05B 15/02
See application file for complete search history.

(56) References Cited

U.S. PATENT DOCUMENTS 3,343,409 A 9/1967 Gibbs
5,204,595 A 4/1993 Opal et al.
(Continued)

FOREIGN PATENT DOCUMENTS

WO 1993002289 A1 2/1993
WO 2014127326 A1 8/2014

OTHER PUBLICATIONS

Wu et al., "Technology for Controlling Eccentric Wear of Sucker Rods and Tubing in Highly Deviated Directional Well", Computational and Information Sciences (ICCIS), 2011 International Conference on, pp. 633-636, Conference Location :Chengdu, China, Oct. 21-23, 2011.

(Continued)

*Primary Examiner* — Bryan Lettman
*Assistant Examiner* — Charles W Nichols
(74) *Attorney, Agent, or Firm* — GE Global Patent Operation; Pabitra Chakrabarti

(57) ABSTRACT

A control system for a rod pumping unit is disclosed herein. The control system includes a memory device, a sensor, and a processor. The memory device is configured to store a velocity profile for controlling a sucker rod string of the rod pumping unit. The sensor is configured to take measurements for determining surface load of the sucker rod string. The processor is configured to gain access to the memory device and the velocity profile. The processor is further configured to determine a reference force. The processor is further configured to receive a measurement from the sensor and determine the surface load. The processor is further configured to compute a desired velocity for commanding the rod pumping unit. The desired velocity is computed based on a reference velocity from the velocity profile, the reference force, and the surface load.

17 Claims, 8 Drawing Sheets

(51) Int. Cl.
*F04B 49/20* (2006.01)
*F04B 47/02* (2006.01)
*E21B 43/12* (2006.01)
*E21B 47/00* (2012.01)

(52) U.S. Cl.
CPC ............ *F04B 47/02* (2013.01); *F04B 47/022* (2013.01); *F04B 49/06* (2013.01); *F04B 49/20* (2013.01); *G05B 15/02* (2013.01)

(56) References Cited

U.S. PATENT DOCUMENTS

| | | | |
|---|---|---|---|
| 6,553,778 B2 * | 4/2003 | Tipton | F25B 39/02 |
| | | | 62/196.1 |
| 7,168,924 B2 | 1/2007 | Beck et al. | |
| 7,530,799 B2 | 5/2009 | Smith | |
| 8,037,012 B1 * | 10/2011 | Svinos | E21B 43/126 |
| | | | 166/176 |
| 8,444,393 B2 | 5/2013 | Beck et al. | |
| 8,851,860 B1 | 10/2014 | Mail | |
| 8,944,190 B2 | 2/2015 | Wassell et al. | |
| 2011/0103974 A1 * | 5/2011 | Lamascus | F04B 47/02 |
| | | | 417/45 |
| 2012/0205119 A1 | 8/2012 | Wentworth et al. | |
| 2013/0115107 A1 | 5/2013 | Pons | |

OTHER PUBLICATIONS

Ordonez, B. et al., "Sucker-rod pumping system: Simulator and dynamic level control using bottom hole pressure", Emerging Technologies and Factory Automation, 2008. ETFA 2008. IEEE International Conference on, pp. 282-289, Conference Location :Hamburg, Sep. 15-18, 2008.

* cited by examiner

CONTROL SYSTEM AND METHOD OF CONTROLLING A ROD PUMPING UNIT

BACKGROUND

The field of the disclosure relates generally to control of rod pumping units and, more particularly, to a control system and a method of controlling a linear pumping unit as a function of load and position.

Most known rod pumping units (also known as surface pumping units) are used in wells to induce fluid flow, for example oil and water. The linear pumping unit is a particular type of rod pumping unit that converts rotating motion from a prime mover (e.g., an engine or an electric motor) into reciprocating motion above the wellhead. This motion is in turn used to drive a reciprocating down-hole pump via connection through a sucker rod string. The sucker rod string, which can extend miles in length, transmits the reciprocating motion from the wellhead at the surface to a subterranean piston and valves in a fluid bearing zone of the well. The reciprocating motion of the piston valves induces the fluid to flow up the length of the sucker rod string to the wellhead.

Rod pumping units are exposed to a wide range of conditions. These vary by well application, the type and proportions of the pumping unit's linkage mechanism, and the conditions of the well. Furthermore, well conditions, such as downhole pressure, may change over time. These conditions may cause variability in the flow of the fluid. In addition, these conditions affect the sucker rod string. The sucker rod string transmits dynamic loads from the downhole pump to the rod pumping unit. The sucker rod string behaves similarly to a spring over long distances. The sucker rod string elongates and retracts based on exposure to variable tensile stress. The response of the sucker rod string is damped somewhat due to its submergence in a viscous fluid (water and oil), but the motion profile of the rod pumping unit combined with the step function loading of the pump generally leaves little time for the oscillations to decay before the next perturbation is encountered.

The rod pumping unit imparts continually varying motion on the sucker rod string. The sucker rod string responds to the varying motion by sending variable stress waves down its length to alter its own motion. The sucker rod string stretches and retracts as it builds the force necessary to move the down-hole pump and fluid. Traveling stress waves from multiple sources interfere with each other along the sucker rod string (some constructively, others destructively) as they traverse its length and reflect load variations back to the rod pumping unit, where they can be measured. The various stresses on the sucker rod string cause fatigue on the rods, ultimately impacting the reliability of the rod pumping system. While this problem is widely recognized, commercially available rod pump controllers fail to mitigate it, and typically are controlled to maintain fluid fillage and tubing reliability only by speeding up or slowing down the pumping unit with a single velocity profile.

BRIEF DESCRIPTION

In one aspect, a system includes a control system for a rod pumping unit. The control system includes a memory device, a sensor, and a processor. The memory device is configured to store a velocity profile for controlling a sucker rod string of the rod pumping unit. The sensor is configured to take measurements for determining surface load of the sucker rod string. The processor is configured to gain access to the memory device and the velocity profile. The processor is further configured to determine a reference force. The processor is further configured to receive a measurement from the sensor and determine the surface load. The processor is further configured to compute a desired velocity for commanding the rod pumping unit. The desired velocity is computed based on a reference velocity from the velocity profile, the reference force, and the surface load.

In another aspect a method of controlling a rod pumping unit is provided. The method includes measuring a surface load on a sucker rod string of the rod pumping unit. The method further includes determining a reference force for the sucker rod string. The method further includes transforming a difference of the reference force and the surface load into a velocity. The method further includes combining the velocity with a reference velocity for the sucker rod string, yielding a desired velocity. The method further includes commanding the desired velocity on the rod pumping unit.

In yet another aspect a rod pumping unit is provided. The rod pumping unit includes a sucker rod string. The rod pumping unit further includes a variable speed drive (VSD), a load cell, and a pumping control unit. The VSD and the load cell are coupled to the pumping control unit. The load cell is coupled to the sucker rod string and is configured to measure a surface load. The pumping control unit is configured to determine a reference force based on a plurality of surface load measurements taken over time by the load cell. The pumping control unit is further configured to compute a velocity based on the reference force and the surface load. The pumping control unit is further configured to compute a desired velocity to command on the VSD based on the velocity and a reference velocity from a velocity profile stored in the pumping control unit.

DRAWINGS

These and other features, aspects, and advantages of the present disclosure will become better understood when the following detailed description is read with reference to the accompanying drawings in which like characters represent like parts throughout the drawings, wherein.

Figure 1:
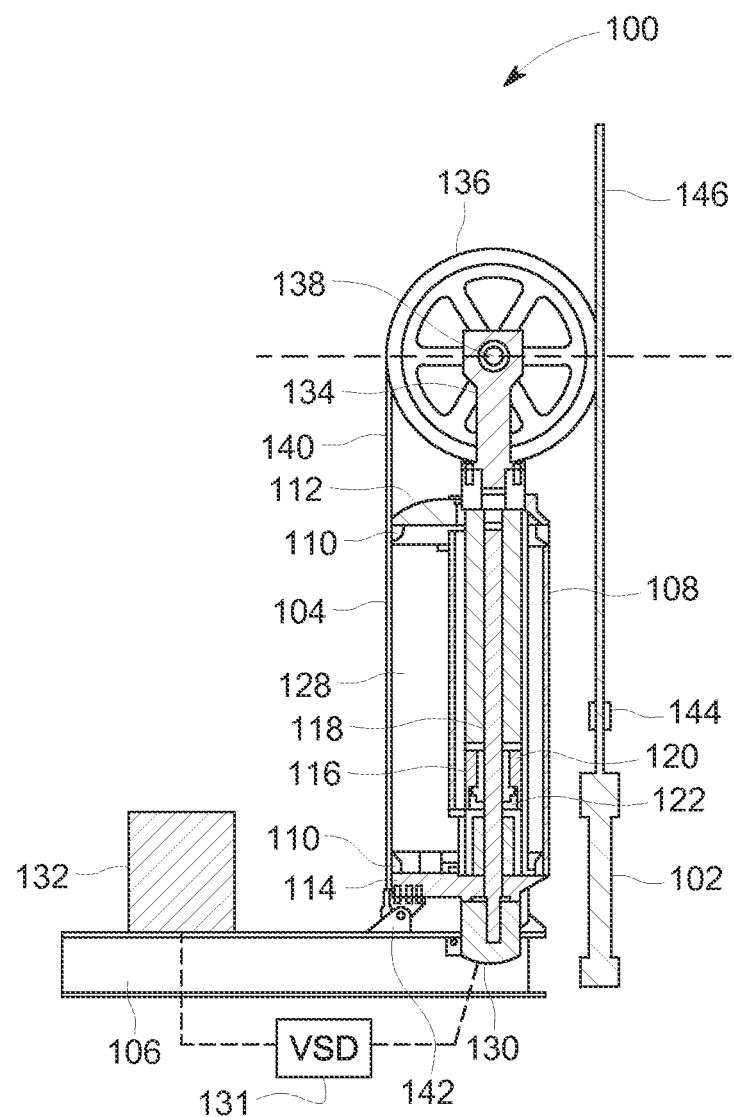
FIG. 1 is a cross-sectional view of an exemplary rod pumping unit in a fully retracted position.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The pumping control unit as described herein provides a cost-effective method for controlling a rod pumping unit to enhance the flow of a fluid induced by the rod pumping unit while reducing load fluctuations on the rod pumping unit itself. More specifically, pumping control units described herein utilize a position control mode and a load control mode in combination with active damping to actively control pump velocity and optimize pump production. Furthermore, the pumping control unit permits faster pumping strokes without increasing fatigue over time, ensuring that the motion of the sucker rod string will not damage the sucker rod string, the rod pumping unit, or the well itself.

Figure 2:
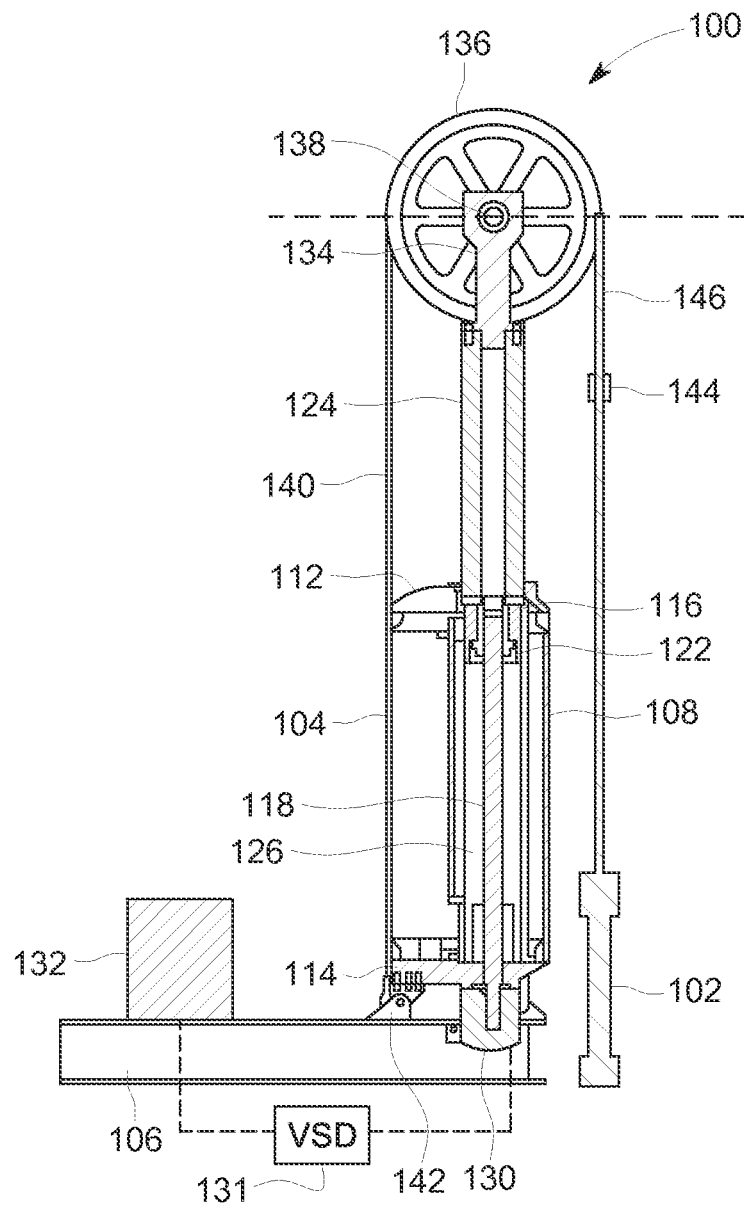
FIG. 2 is a cross-sectional view of the rod pumping unit shown in FIG. 1 in a fully extended position.

FIGS. 1 and 2 are cross-sectional views of an exemplary rod pumping unit 100 in fully retracted (1) and fully extended (2) positions. In the exemplary embodiment, rod pumping unit 100 (also known as a linear pumping unit) is a vertically oriented rod pumping unit having a linear motion vertical vector situated adjacent to a wellhead 102. Rod pumping unit 100 is configured to transfer vertical linear motion into a subterranean well (not shown) through a sucker rod string (not shown) for inducing the flow of a fluid. Rod pumping unit 100 includes a pressure vessel 104 coupled to a mounting base structure 106. In some embodiments, mounting base structure 106 is anchored to a stable foundation situated adjacent to the fluid-producing subterranean well. Pressure vessel 104 may be composed of a cylindrical or other appropriately shaped shell body 108 constructed of formed plate and cast or machined end flanges 110. Attached to the end flanges 110 are upper and lower pressure heads 112 and 114, respectively.

Penetrating upper and lower pressure vessel heads 112 and 114, respectively, is a linear actuator assembly 116. This linear actuator assembly 116 is includes a vertically oriented threaded screw 118 (also known as a roller screw), a planetary roller nut 120 (also known as a roller screw nut assembly), a forcer ram 122 in a forcer ram tube 124, and a guide tube 126.

Roller screw 118 is mounted to an interior surface 128 of lower pressure vessel head 114 and extends up to upper pressure vessel head 112. The shaft extension of roller screw 118 continues below lower pressure vessel head 114 to connect with a compression coupling (not shown) of a motor 130. Motor 130 is coupled to a variable speed drive (VSD) 131 configured such that the motor's 130 rotating speed may be adjusted continuously. VSD 131 also reverses the motor's 130 direction of rotation so that its range of torque and speed may be effectively doubled. Roller screw 118 is operated in the clockwise direction for the upstroke and the counter-clockwise direction for the downstroke. Motor 130 is in communication with a pumping unit controller 132. In the exemplary embodiment, pumping unit controller 132 transmits commands to motor 130 and VSD 131 to control the speed, direction, and torque of roller screw 118.

Within pressure vessel 104, the threaded portion of roller screw 118 is interfaced with planetary roller screw nut assembly 120. Nut assembly 120 is fixedly attached to the lower segment of forcer ram 122 such that as roller screw 118 rotates in the clockwise direction, forcer ram 122 moves upward. Upon counterclockwise rotation of roller screw 118, forcer ram 122 moves downward. This is shown generally in FIGS. 1 and 2. Guide tube 126 is situated coaxially surrounding forcer tube 124 and statically mounted to lower pressure head 114. Guide tube 126 extends upward through shell body 108 to slide into upper pressure vessel head 112.

An upper ram 134 and a wireline drum assembly 136 and fixedly coupled and sealed to the upper end of forcer ram 122. Wireline drum assembly 136 includes an axle 138 that passes laterally through the top section of the upper ram 134. A wireline 140 passes over wireline drum assembly 136 resting in grooves machined into the outside diameter of wireline drum assembly 136. Wireline 140 is coupled to anchors 142 on the mounting base structure 106 at the side of pressure vessel 104 opposite of wellhead 102. At the wellhead side of pressure vessel 104, wireline 140 is coupled to a carrier bar 144 which is in turn coupled to a polished rod 146 extending from wellhead 102.

Rod pumping unit 100 transmits linear force and motion through planetary roller screw nut assembly 120. Motor 130 is coupled to the rotating element of planetary roller screw nut assembly 120. By rotation in either the clockwise or counterclockwise direction, motor 130 may affect translatory movement of planetary roller nut 120 (and by connection, of forcer ram 122) along the length of roller screw 118.

Figure 3:
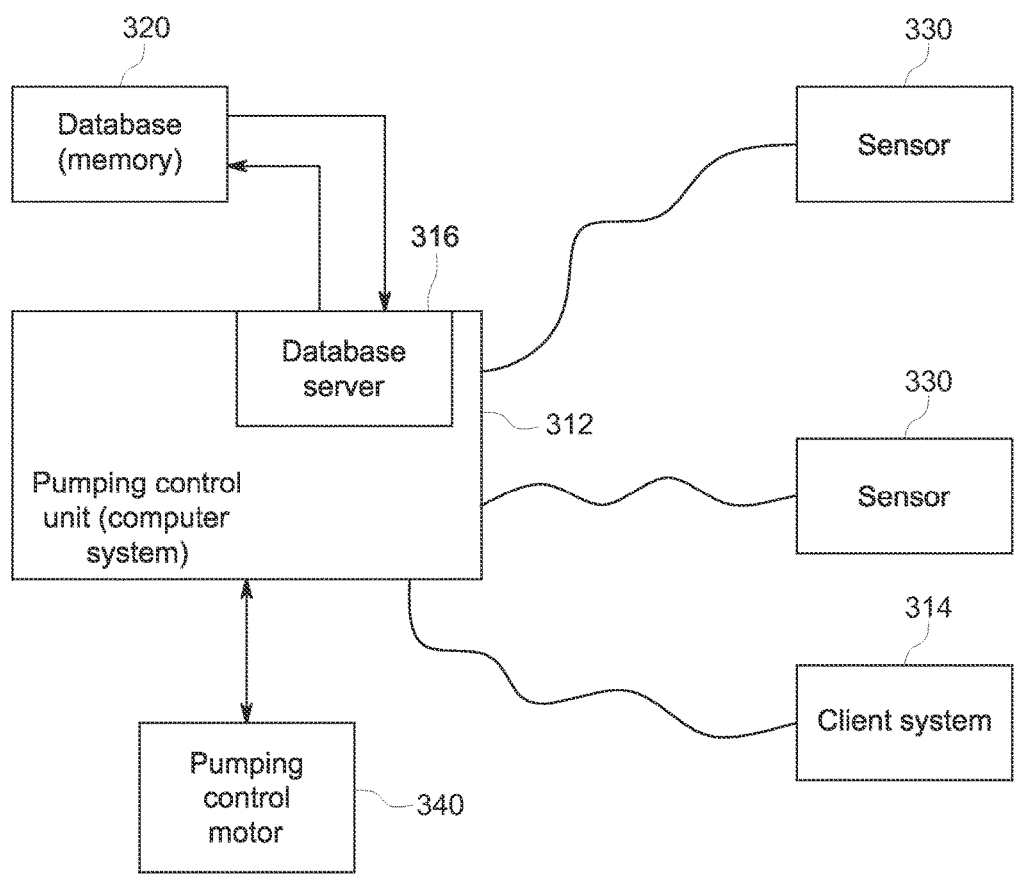
FIG. 3 is a schematic view of a control system for controlling the rod pumping unit shown in FIGS. 1 and 2.

FIG. 3 is a schematic view of a control system 300 for controlling rod pumping unit 100 (shown in FIGS. 1 and 2). In the exemplary embodiment, control system 300 is used for compiling and responding to data from a plurality of sensors 330 and controlling the stroke of rod pumping unit 100. A stroke of rod pumping unit 100 represents the time that it takes rod pumping unit 100 to extend from fully retracted to fully extended and back to fully retracted, as shown in FIGS. 1 and 2. Sensors 330 are in communication with a pumping control unit 312. Sensors 330 connect to pumping control unit 312 through many interfaces including without limitation a network, such as a local area network (LAN) or a wide area network (WAN), dial-in-connections, cable modems, Internet connection, wireless, and special high-speed Integrated Services Digital Network (ISDN) lines. Sensors 330 receive data about conditions of rod pumping unit 100 and report those conditions to pumping control unit 312. Pumping control unit 312 may include, but is not limited to, pumping unit controller 132 (shown in FIG. 1).

Pumping control unit 312 is in communication with pumping control motor 340. In the exemplary embodiment, pumping control motor 340 includes motor 130 (shown in FIG. 1) and a VSD (not shown). Pumping control motor 340 transmits data to pumping control unit 312 and receives commands from pumping control unit 312. Pumping control unit 312 controls pumping control motor 340 by a commanded position. Pumping control motor 340 connects to pumping control unit 312 through many interfaces including without limitation a network, such as a local area network (LAN) or a wide area network (WAN), dial-in-connections, cable modems, Internet connection, wireless, and special high-speed Integrated Services Digital Network (ISDN) lines.

A database server 316 is coupled to database 320, which contains information on a variety of matters, as described below in greater detail. In one embodiment, centralized database 320 is stored on pumping control unit 312. In an alternative embodiment, database 320 is stored remotely from pumping control unit 312 and may be non-centralized. In some embodiments, database 320 includes a single database having separated sections or partitions or in other embodiments, database 320 includes multiple databases, each being separate from each other. Database 320 stores condition data received from multiple sensors 330. In addition, database 320 stores constraints, component data, component specifications, equations, and historical data generated as part of collecting condition data from multiple sensors 330.

Pumping control unit 312 is in communication with a client system 314. Pumping control unit 312 connects to client system 314 through many interfaces including without limitation a network, such as a local area network (LAN) or a wide area network (WAN), dial-in-connections, cable modems, Internet connection, wireless, and special high-speed Integrated Services Digital Network (ISDN) lines. Pumping control unit 312 transmits data about the operation of rod pumping unit 100 to client system 314. This data could include data from sensors, current strokes per minute and other operational data that client system 314 could monitor. Furthermore, pumping control unit 312 receives additional instructions from client system 314 or updated stroke timing data. Additionally, client system 314 accesses database 320 through pumping control unit 312. Client system 314 presents the data from pumping control unit to a user. In other embodiments, pumping control unit 312 includes a display unit (not shown) to display data directly to a user (not shown).

Figure 4:
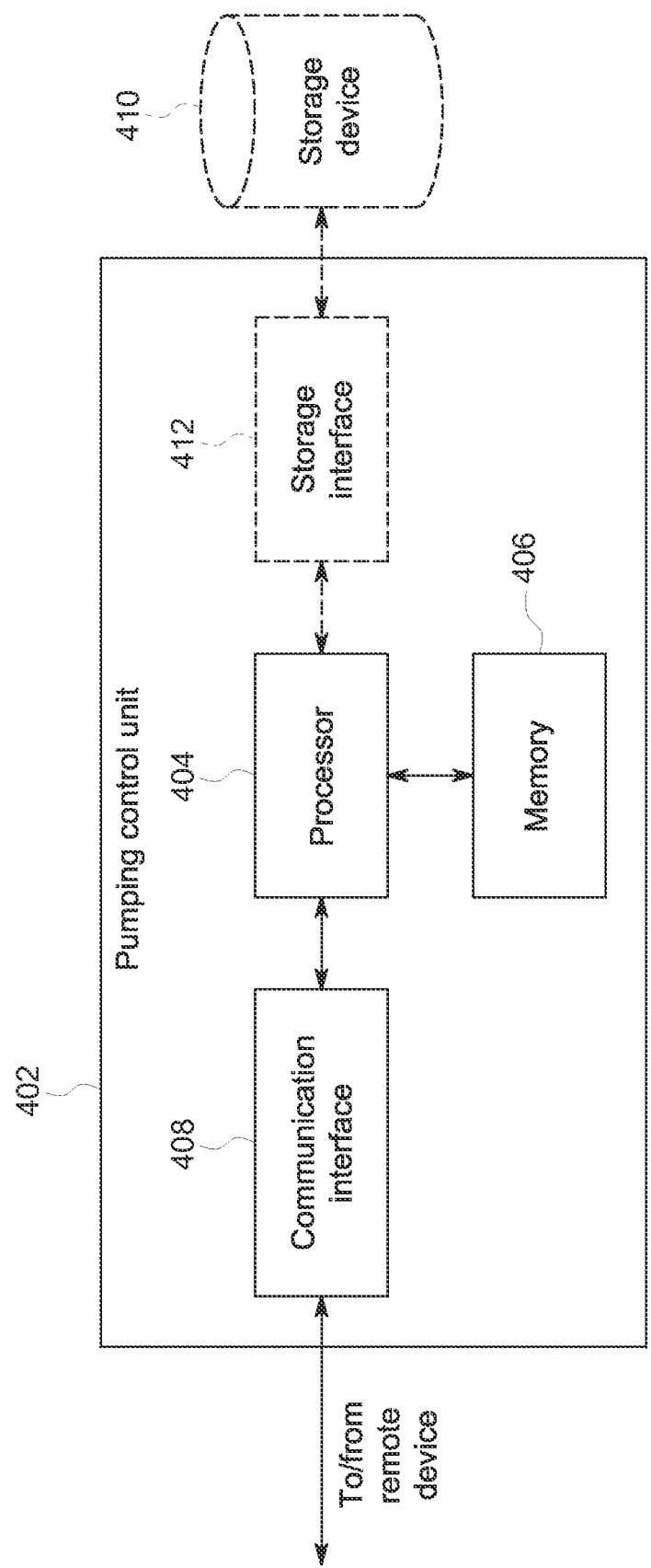
FIG. 4 is a schematic view of an exemplary configuration of a pumping control unit that may be used with the system shown in FIG. 3.

FIG. 4 is a schematic view of an exemplary configuration of a pumping control unit 402 that may be used with control system 300 (shown in FIG. 3). More specifically, pumping control unit 402 includes a processor 404 for executing instructions. Instructions are stored in a memory 406. Processor 404 may include one or more processing units (e.g., in a multi-core configuration).

Processor 404 is operatively coupled to a communication interface 408 through which pumping control unit 402 is capable of communicating with a remote device (not shown), such as another computing device, sensors 330 (shown in FIG. 3), pumping control motor 340 (shown in FIG. 3), or client systems 314 (shown in FIG. 3). For example, communication interface 408 may receive requests from client systems 314, as illustrated in FIG. 3.

Processor 404 is also operatively coupled to a storage device 410. Storage device 410 is any computer-operated hardware suitable for storing and/or retrieving data, such as, but not limited to, data associated with database 320 (shown in FIG. 3). In some embodiments, storage device 410 is integrated in pumping control unit 402. For example, pumping control unit 402, in such embodiments, may include one or more hard disk drives as storage device 410. In other embodiments, storage device 410 is external to pumping control unit 402 and is accessed by one or more pumping control units 402. For example, storage device 410 may include a storage area network (SAN), a network attached storage (NAS) system, and/or multiple storage units such as hard disks and/or solid state disks in a redundant array of inexpensive disks (RAID) configuration.

In some embodiments, processor 404 is operatively coupled to storage device 410 via a storage interface 412. Storage interface 412 is any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Processor 404 executes computer-executable instructions for implementing aspects of this disclosure. In some embodiments, the processor 404 is transformed into a special purpose microprocessor by executing computer-executable instructions or by otherwise being programmed. For example, the processor 404 is programmed with instructions as described further below.

Processor 404 is configured to control pumping control motor 340 by commanding a desired velocity for the sucker rod string (not shown). Processor 404 is configured to compute the desired velocity in a position control mode and in a force control mode.

Processor 404 is configured to use the position control mode when the surface position of the sucker rod string is near stroke limits, which is when the sucker rod string reaches the positional extents of its stroke and changes direction. The position control mode is used to ensure the positional extents of the stroke are actually reached as the sucker rod string's surface velocity passes through zero. The near-zero surface velocity of the sucker rod varies for different rod pumping units. In one embodiment, the surface position of the sucker rod string is near stroke limits when the sucker rod string is within 10% of either stroke extent with respect to position. For example, for a stroke of 100 inches, processor 404 uses the position control mode when the sucker rod string is positioned from 0 to 10 inches, and when positioned from 90 to 100 inches, which is when the surface position of the sucker rod string is near stroke limits.

When the surface velocity of the sucker rod string is non-zero, processor 404 is configured to use the force control mode. As the sucker rod string approaches a positional extent of its stroke and surface velocity nears zero, processor 404 is configured to transition smoothly from the force control mode to the position control mode. Likewise, as the sucker rod string moves away from a positional extent, i.e., toward the opposite positional extent, and surface velocity tends away from zero, processor 404 is configured to transition smoothly from the position control mode to the force control mode. The duration of the transition varies per embodiment. In certain embodiments, for example, and without limitation, the transition occurs when as the sucker rod string translates from 5% to 15% of its stroke and from 85% to 95% of its stroke. Similarly, the opposite transition occurs when the sucker rod string translates from 15% to 5% of its stroke and from 95% to 85% of its stroke. Processor 404, in certain embodiments, carries out the transition by weighting the force control mode output by an alpha term, $\alpha$. The alpha term is a variable scalar value. Processor 404 also weights the position control mode output by $1-\alpha$. The alpha term, $\alpha$, is then varied from zero to one over time. The alpha term, in certain embodiments, is varied linearly over time. In other embodiments, the alpha term is varied non-linearly.

In the position control mode, the desired velocity is computed as a function of an actual surface position of the sucker rod string and a position profile. The surface position of the sucker rod string is measured by one of sensors 330 (shown in FIG. 3). Sensors 330 include a position sensor, such as a position encoder that is coupled to the sucker rod string or rod pumping unit 100. The position profile is stored in memory 406 or on storage device 410. The position profile, in certain embodiments, includes a table of surface positions indexed by time. Processor 404 is configured to compute a velocity based on a reference position from the position profile and the measured surface position from sensors 330. Processor 404 computes a difference of the reference position and the measured surface position and applies a position gain, $k_x$, to the difference. The result is the velocity.

In the force control mode, the desired velocity is computed as a function of an actual surface load of the sucker rod string and a reference force. The surface load is measured by one of sensors 330. Sensors 330 include a load cell that is configured to be coupled to the sucker rod string. In alternative embodiments, sensors 330 include a torque sensor for measuring motor torque that can be translated to a measured surface load. Processor 404 is configured to compute the reference force based on multiple surface load measurements taken over time by sensors 330. In certain embodiments, processor 404 computes a weighted average of the surface load measurements and then passes the result through a low-pass filter. In certain embodiments, the cutoff frequency for the low-pass filter is set according to the speed of the rod pumping unit, which is generally expressed in strokes per minute. In such embodiments, a higher cutoff frequency is used at higher pump speeds and, likewise, a lower cutoff frequency is used at lower pump speeds. Processor 404 is configured to compute a velocity based on the surface load measured by sensors 330 and the reference force. Processor 404 computes a difference of the reference force and the measured surface load and applies a force gain, $k_f$, to the difference. The result is the velocity.

In both the position control mode and the force control mode, the computed velocity is summed with a reference velocity determined from a velocity profile for rod pumping unit 100. The result is a desired velocity that is commanded on the VSD.

Figure 5:
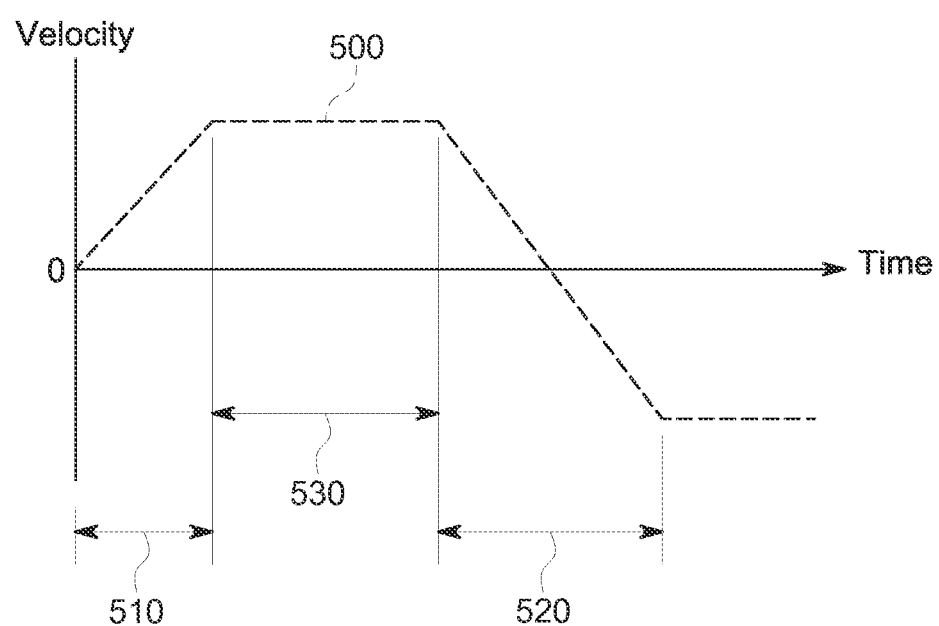
FIG. 5 is a plot of an exemplary velocity profile for the rod pumping unit shown in FIGS. 1 and 2.

FIG. 5 is a plot of an exemplary velocity profile 500 for a linear pumping unit, such as rod pumping unit 100 (shown in FIG. 1). Velocity profile 500 is characterized by its "trapezoidal" shape rather than a sinusoidal shape. The trapezoidal shape features periods of time where velocity increases linearly, such as period 510, and other periods of time where velocity decreases linearly, such as period 520. Velocity is held steady, or "flat," between the periods of increase and decrease, such as in period 530. In alternative embodiments, velocity profile 500 is any suitable shape for controlling rod pumping unit 100, including, for example, and without limitation, sinusoidal.

Figure 6:
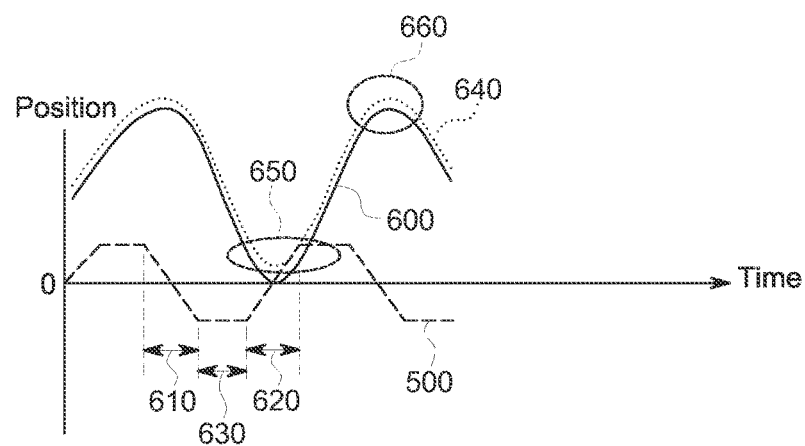
FIG. 6 is a plot of an exemplary position profile for the rod pumping unit shown in FIGS. 1 and 2.

FIG. 6 is a plot of an exemplary position profile 600 for a linear pumping unit, such as rod pumping unit 100 (shown in FIG. 1). Position profile 600 is a result of velocity profile 500, which is shown on the plot for reference. Position profile 600 illustrates surface position for a stroke for rod pumping unit 100, which is generally vertical motion of the sucker rod string, which is referred to as the x-dimension. A positive velocity in velocity profile 500 corresponds to increasing position values, while negative velocity corresponds to decreasing position values. The apexes of position profile 600 occur as velocity profile 500 passes through zero.

Position profile 600 also illustrates use of the position control mode and the force control mode at different times during a pump stroke. The position control mode is used near where position profile 600 reaches its extents, which corresponds to the apexes of position profile 600. For example, and without limitation, the position control mode is used near the upper pump stroke extent in a zone 610. The position control mode is also used near the lower pump stroke extent in a zone 620. Between zones 610 and 620, is a zone 630, where the force control mode is used. Use of a combination of the position control mode and force control mode reduces the likelihood of under-stroke and over-stroke occurrences that can occur when using a "pure" force control. FIG. 6 also includes an alternative position profile 640 to illustrate an under-stroke condition 650 and an over-stroke condition 660.

Figure 7:
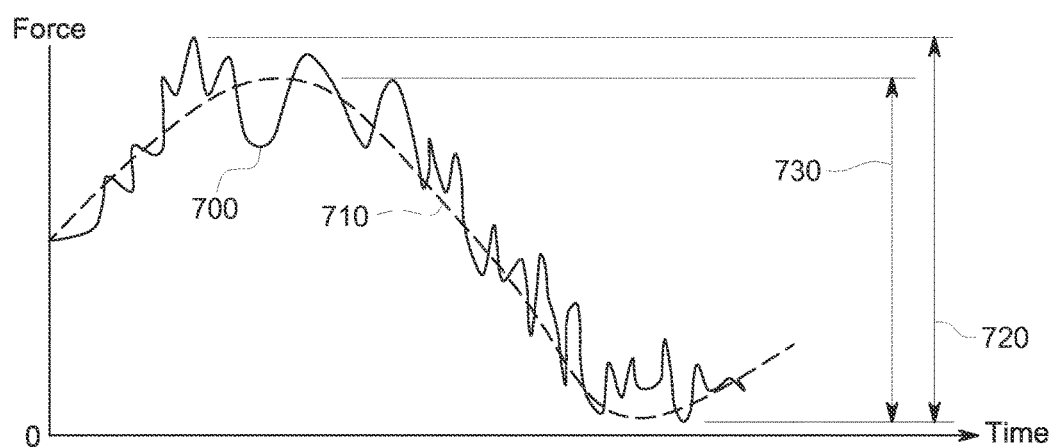
FIG. 7 is a plot of an exemplary force profile for the rod pumping unit shown in FIGS. 1 and 2.

FIG. 7 is a plot of an exemplary force profile 700 for a linear pumping unit, such as rod pumping unit 100 (shown in FIG. 1). Force profile 700 is a result of velocity profile 500. Force profile 700 roughly follows a reference force profile 710, but with various undulations occurring over time. Embodiments of control system 300 are configured to reduce the undulations such that the resulting force profile 700 adheres more closely to reference force profile 710. In doing so, a peak-to-peak force 720 for force profile 700, for example, and without limitation, is reduced to a peak-to-peak force 730. The reduction in peak-to-peak force for force profile 700 permits operators of rod pumping unit 100 to drive rod pumping unit 100 at higher speeds without incurring additional fatigue on the sucker rod string or other components. Increased speeds, in strokes per minute, facilitate increased fluid production from rod pumping unit 100.

Figure 8:
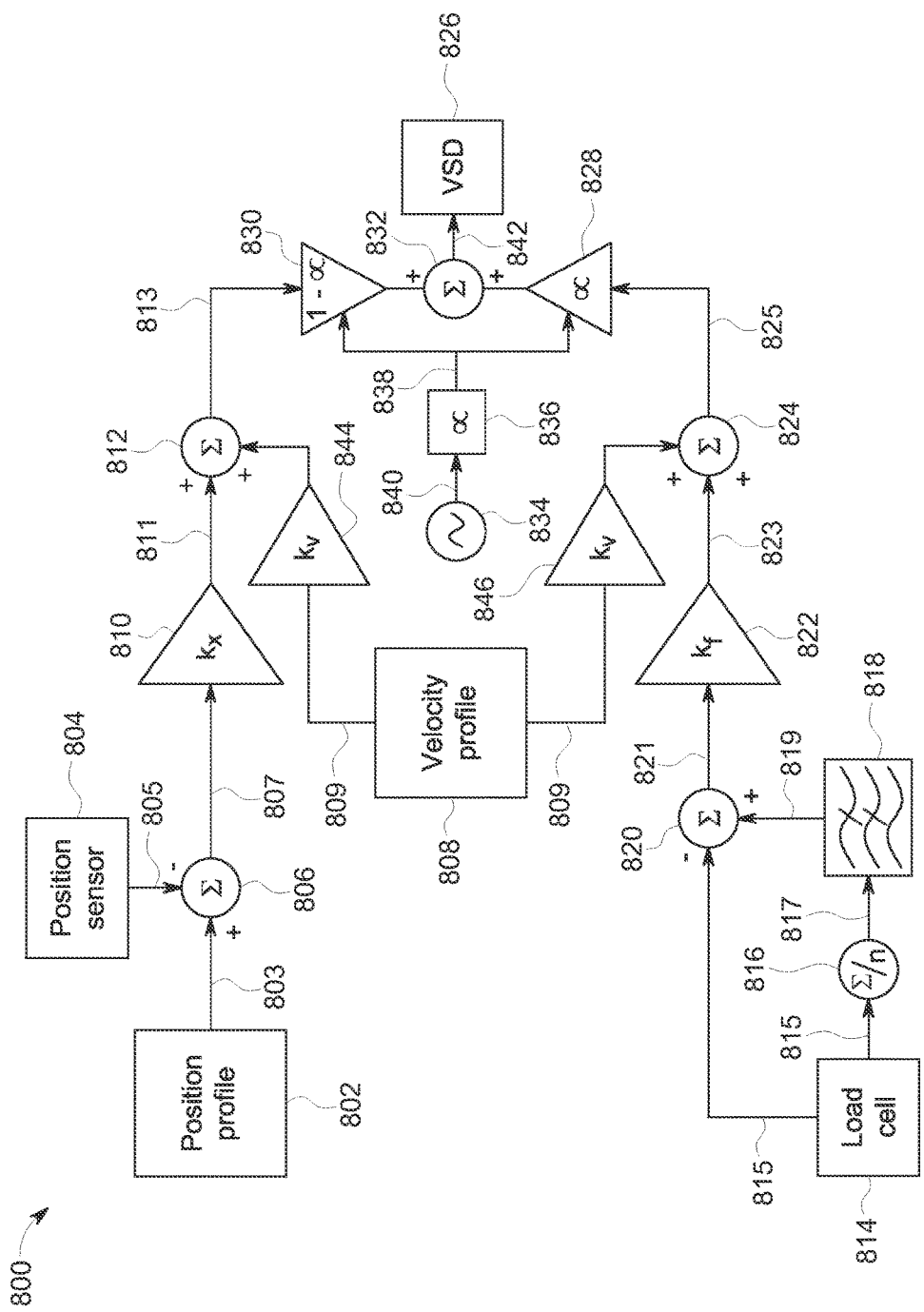
FIG. 8 is a schematic diagram of an exemplary control system for the rod pumping unit shown in FIGS. 1 and 2.

FIG. 8 is a schematic diagram of an exemplary control system 800 for controlling a linear pumping unit, such as rod pumping unit 100 (shown in FIG. 1). Control system 800 includes a position profile 802 having a reference position 803 and a position sensor 804 configured to detect a measured surface position 805. A summer 806 computes a difference 807 of reference position 803 from position profile 802 and measured surface position 805 from position sensor 804.

Control system 800 further includes a velocity profile 808 having a reference velocity 809. Difference 807 computed by summer 806 is amplified by amplifier 810, yielding a velocity 811 as a function of position profile 802 and measured surface position 805. An amplifier 844 applies a velocity gain, $k_v$, to reference velocity 809. Amplifier 810 applies a position gain, $k_x$. Velocity 811 is summed at a summer 812, with reference velocity 809 from velocity profile 808 to produce a desired velocity 813.

Control system 800 further includes a load cell 814 configured to measure a surface load 815 on the sucker rod string for rod pumping unit 100. Multiple measurements of surface load 815 are taken over time by load cell 814 and averaged at an averaging module 816. Averaging module 816 is configured to compute a weighted average 817 of the multiple measurements of the surface load 815. Weighted average 817 is then passed through a low-pass filter 818. The low-pass filtered weighted average is a reference force 819 for rod pumping unit 100. Control system 800 further includes a summer 820 and an amplifier 822. Summer 820 is configured to compute a difference 821 of reference force 819 and measured surface load 815. Difference 821 is then amplified by amplifier 822 using a force gain, $k_f$. The result is a velocity 823 as a function of surface force. Velocity 823 is then summed with reference velocity 809, which is amplified by an amplifier 846 to apply the velocity gain, $k_v$, to reference velocity 809, at a summer 824 to produce a desired velocity 825.

Control system 800 is configured to drive a VSD 826 using a combination of the velocity as a function of position, i.e., the position control mode and the velocity as a function of force, i.e., the force control mode. Control system 800 further includes amplifiers 828 and 830, a summer 832, a clock 834, and a scalar block 836. Control system 800 uses a blend of the position control mode and the force control mode during the transition periods between position control mode and force control mode. Amplifier 828 applies a gain, $\alpha$, to desired velocity 825 from the force control mode, while amplifier 830 applies a reciprocal gain, $1-\alpha$, to desired velocity 813 from the position control mode. Scalar block 836 varies the value of $\alpha$ 838 according to an output 840 of clock 834. As value 838 of $\alpha$ increases, the proportion of force control increases with respect to position control. As the value of $\alpha$ 838 decreases, the proportion of position control increases with respect to force control. When $\alpha$ 838 is 1, control system 800 is in force control mode. When $\alpha$ 838 is zero, control system 800 is in position control mode. The desired velocities 813 and 825 from both the position control mode and the force control mode are summed by summer 832, yielding a commanded velocity 842.

Figure 9:
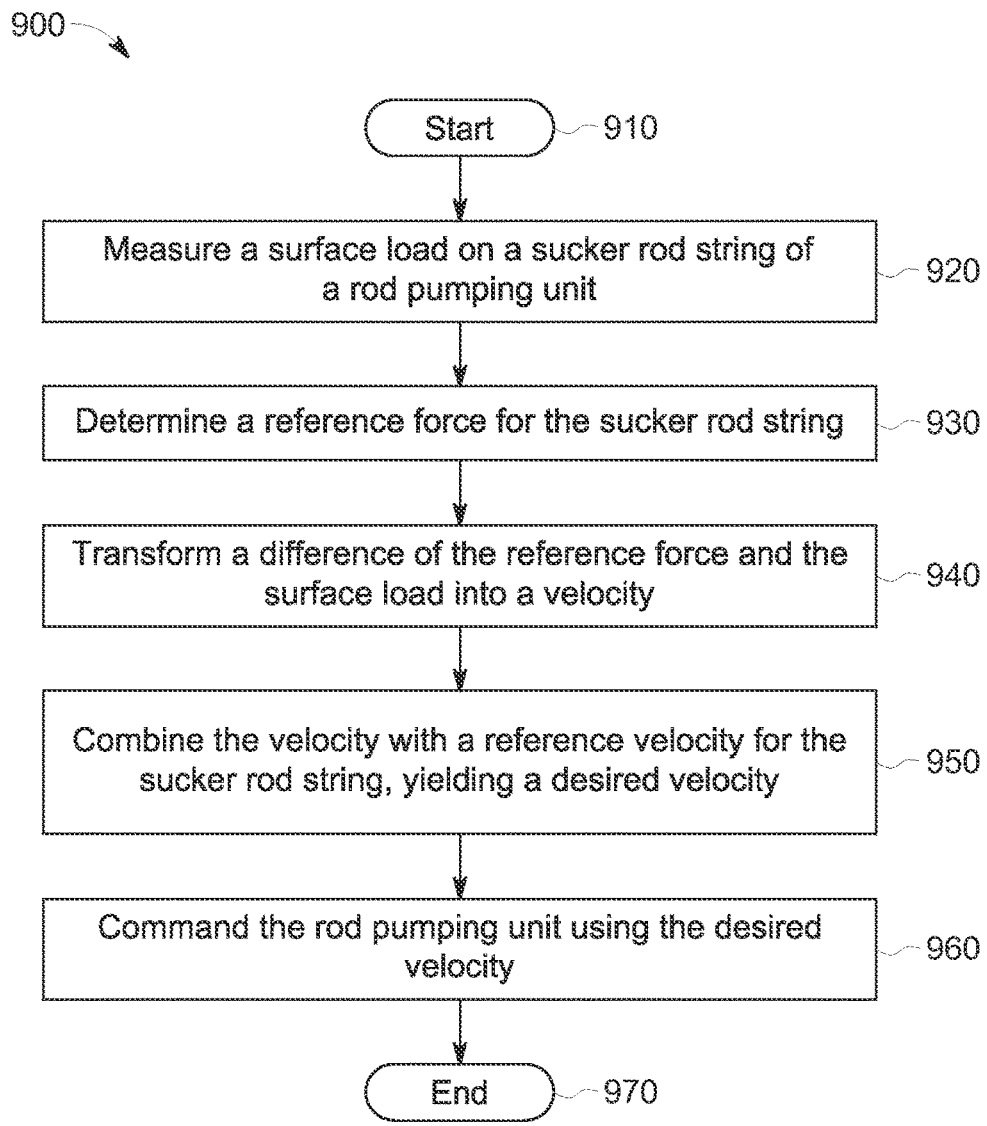
FIG. 9 is a flow diagram of an exemplary method of controlling the rod pumping unit shown in FIGS. 1 and 2.

FIG. 9 is a flow diagram of an exemplary method 900 of controlling rod pumping unit 100 (shown in FIG. 1) using control system 800 (shown in FIG. 8). The method begins at a start step 910. At a measuring step 920, a surface load on the sucker rod string is measured by load cell 814 (shown in FIG. 8). A reference force is determined at reference force step 930. The reference force is determined as a function of a weighted average from averaging module 816 (shown in FIG. 8) that is low-pass filtered by low-pass filter 818 (shown in FIG. 8). A difference of the reference force and the measured surface force is transformed to a velocity at feed forward step 940. The transformation is made by amplifier 822 (shown in FIG. 8) that applies force gain $k_f$. At a combining step 950, the velocity is combined with a reference velocity from velocity profile 808 (shown in FIG. 8), which yields a desired velocity that is commanded on VSD 826 (shown in FIG. 8) of rod pumping unit 100 at a commanding step 960.

In certain embodiments, method 900 further includes another measuring step where a surface position of the sucker rod string is taken by position sensor 804 (shown in FIG. 8). The method further includes a reference position step where a reference position is determined based on position profile 802 (shown in FIG. 8). A difference of the measured surface position and the reference position is then amplified by amplifier 810 (shown in FIG. 8), which applies a position gain, $k_x$, yielding a velocity based on surface position. Method 900 further includes combining the velocity with the reference velocity from velocity profile 808 (shown in FIG. 8), yielding a desired velocity based on position. This desired velocity is then commanded on VSD 826 at commanding step 960. The method ends at an end step 970.

The above-described pumping control unit provides a cost-effective method for controlling a rod pumping unit to enhance the flow of a fluid induced by the rod pumping unit while reducing load fluctuations on the rod pumping unit itself. More specifically, pumping control units described herein utilize a position control mode and a load control mode in combination with active damping to actively control pump velocity and optimize pump production. Furthermore, the pumping control unit permits increased pumping strokes per minute without increasing fatigue over time, ensuring that the motion of the sucker rod string will not damage the sucker rod string, the rod pumping unit, or the well itself.

An exemplary technical effect of the methods, systems, and apparatus described herein includes at least one of: (a) reducing force fluctuations on the sucker rod string; (b) lowering a peak-to-peak force profile; (c) increasing operating speeds in strokes per minute for rod pumping units due to lower peak-to-peak force profiles; (d) increasing production from the rod pumping unit due to increasing operating speeds; (e) reducing likelihood of over-stroke and under-stroke occurrence; and (f) reducing compounding position errors caused by over-stroke and under-stroke conditions.

Exemplary embodiments of control systems and methods of controlling a rod pumping unit are described above in detail. The systems and methods described herein are not limited to the specific embodiments described herein, but rather, components of systems or steps of the methods may be utilized independently and separately from other components or steps described herein. For example, the methods may also be used in combination with other linear pumping units, and are not limited to practice with only linear pumping units as described herein. Rather, the exemplary embodiments may be implemented and utilized in connection with many other pumping control applications.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a rod pumping unit, comprising:
a memory device configured to store a velocity profile and a position profile for controlling a sucker rod string of the rod pumping unit, wherein the velocity profile includes a reference velocity, and wherein the position profile includes a reference position;
a load cell for measuring a surface load of the sucker rod string;
a position sensor configured to measure a surface position of the sucker rod string; and
a processor configured to:
access said memory device and the velocity profile stored therein;
access said memory device and the position profile stored therein;
determine a difference between a reference force and the surface load measured by the load cell;
determine a difference between a reference position and the surface position of the sucker rod string measured by the position sensor;
compute a desired velocity for a force control mode of operation of the control system as a function of force based on the reference velocity, the reference force, and the surface load of the sucker rod string measured by the load cell when the position sensor measures that the surface position of the sucker rod string is no longer near stroke limits;
compute a desired velocity for a position control mode of operation of the control system as a function of position based on the reference velocity, the reference position, and the surface position of the sucker rod string measured by the position sensor when the position sensor measures that the surface position of the sucker rod string is near stroke limits;
control the rod pumping unit using the desired velocity computed for the position control mode of operation of the control system when the surface velocity of sucker rod string is near stroke limits; and
control the rod pumping unit using the desired velocity computed for the force control mode of operation of the control system when the surface position of the sucker rod string is no longer near stroke limits, wherein a surface position near stroke limits is within 10% of either stroke extent.

2. The control system in accordance with claim 1, wherein the desired velocity for the position control mode of operation of the control system is computed by:
multiplying the difference between the reference position and the surface position of the sucker rod string measured by the position sensor by a position gain, thereby yielding a velocity as a function of the position profile and the surface position of the sucker rod string measured by the position sensor;
multiplying the reference velocity by a velocity gain;
summing the velocity as the function of the position profile and the surface position of the sucker rod string measured by the position sensor with the reference velocity.

3. The control system in accordance with claim 1, wherein said processor is further configured to compute the desired velocity for the position control mode of operation of the control system when the position sensor measures that the surface position of the sucker rod string is near stroke limits.

4. The control system in accordance with claim 3, wherein said processor is further configured to transition from the position control mode of operation of the control system to the force control mode of operation of the control system when the position sensor measures that the surface position of the sucker rod string is no longer near stroke limits.

5. The control system in accordance with claim 1, wherein the reference force includes a weighted average of a plurality of surface load measurements taken over time.

6. The control system in accordance with claim 5, wherein the reference force further includes a low-pass filtered weighted average of the plurality of surface load measurements.

7. The control system in accordance with claim 1, wherein the desired velocity for the force control mode of operation of the control system is computed by:
   multiplying the difference between the reference force and the surface load measured by the load cell by a force gain, thereby yielding a velocity as a function of surface force;
   multiplying the reference velocity by a velocity gain; and
   summing the velocity as a function of surface force with the reference velocity.

8. A method of controlling a rod pumping unit, said method comprising:
   measuring a surface load on a sucker rod string of the rod pumping unit using a load cell;
   measuring a surface position of the sucker rod string using a position sensor;
   determining a difference between a reference force and the surface load for the sucker rod string;
   determining a difference between a reference position and the surface position of the sucker rod string;
   computing a desired velocity for a force control mode of operation of a control system as a function of force based on a reference velocity, a reference force, and the surface load of the sucker rod string when the position sensor measures that the surface position of the sucker rod string is no longer near stroke limits;
   computing a desired velocity for a position control mode of operation of the control system as a function of position based on the reference velocity, the reference position, and the surface position of the sucker rod string when the position sensor measures that the surface position of the sucker rod string is near stroke limits;
   controlling the rod pumping unit using the desired velocity computed for the position control mode of operation of the control system when the surface velocity of sucker rod string is near stroke limits; and
   controlling the rod pumping unit using the desired velocity computed for the force control mode of operation of the control system when the surface position of the sucker rod string is no longer near stroke limits, wherein a surface position near stroke limits is within 10% of either stroke extent.

9. The method in accordance with claim 8, wherein the reference position is determined by:
   looking-up the reference position in a position profile look-up table stored in non-transitory memory; and
   extracting the reference position from the position profile.

10. The method in accordance with claim 8, wherein the difference of the reference position and the surface position is transformed by applying a position gain to the difference.

11. The method in accordance with claim 8, wherein controlling the rod pump unit further comprises:
   controlling the rod pump unit as a function of the position control mode of operation when the surface position is near stroke limits; and
   transitioning, as the reference velocity tends away from zero, from controlling the rod pump unit as a function of the position control mode of operation to controlling the rod pump unit as a function of the force control mode of operation.

12. The method in accordance with claim 8, wherein controlling the rod pump unit further comprises:
   controlling the rod pump unit as a function of the force control mode of operation when the reference velocity is non-zero; and
   transitioning, as the reference velocity nears zero, from controlling the rod pump unit from the force control mode of operation to the position control mode of operation.

13. The method in accordance with claim 8, wherein determining the reference force comprises:
   computing a weighted average of a plurality of surface load measurements taken over time; and
   low-pass filtering the weighted average to determine the reference force.

14. The method in accordance with claim 13 further comprising computing a cut-off frequency for the low-pass filtering based on a speed of the rod pumping unit in strokes per minute.

15. The method in accordance with claim 8, wherein determining the difference of the reference force and the surface load comprises applying a force gain to the difference.

16. A rod pumping unit having a sucker rod string, said rod pumping unit comprising:
   a variable speed drive (VSD);
   a load cell coupled to the sucker rod string and configured to measure a surface load;
   a position sensor configured to measure a surface position of the sucker rod string; and
   a pumping control unit coupled to said VSD, said load cell and said position sensor, said pumping control unit configured to:
      determine a difference between a reference force and a plurality of surface load measurements taken over a period of time by said load cell;
      determine a different between a reference position and the surface position of the sucker rod string measured by the position sensor;
      compute a desired velocity for a force control mode of operation based on the reference force and the surface load;
      compute a desired velocity for a position control mode of operation as a function of position based on reference position and the surface position when the position sensor measures that the surface position of the sucker rod string is near stroke limits;
      control the rod pumping unit using the desired velocity computed for the position control mode of operation of the control system when the surface velocity of sucker rod string is near stroke limits, and
      control the rod pumping unit using the desired velocity computed for the force control mode of operation of the control system when the surface position of the sucker rod string is no longer near stroke limits, wherein a surface position near stroke limits is within 10% of either stroke extent.

17. The rod pumping unit in accordance with claim 16, wherein the reference position is extracted from a position profile.

* * * * *